C. W. STARKER.
INDUCTION MOTOR WINDING.
APPLICATION FILED JUNE 6, 1911.
1,015,912.
Patented Jan. 30, 1912.
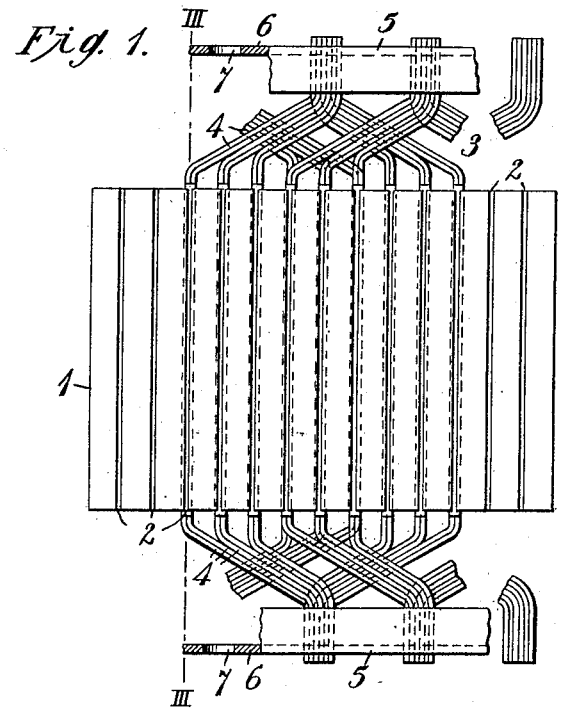
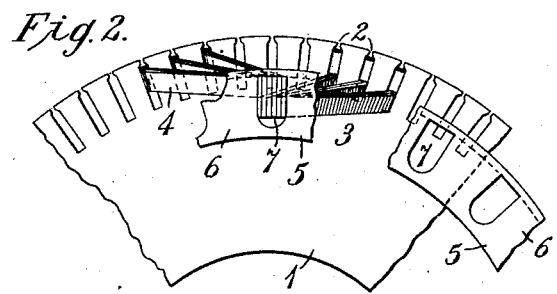
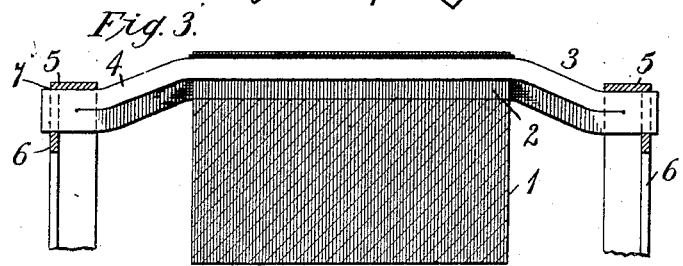
WITNESSES:
INVENTOR
Charles W. Starker
BY
Wesley E. Carr
ATTORNEY

UNITED STATES PATENT OFFICE.

CHARLES WILLIAM STARKER, OF PITTSBURGH, PENNSYLVANIA, ASSIGNOR TO WESTINGHOUSE ELECTRIC AND MANUFACTURING COMPANY, A CORPORATION OF PENNSYLVANIA.

INDUCTION-MOTOR WINDING.

1,015,912.   Specification of Letters Patent.   Patented Jan. 30, 1912.

Application filed June 6, 1911. Serial No. 631,616.

*To all whom it may concern:*

Be it known that I, CHARLES W. STARKER, a subject of the Emperor of Germany, and a resident of Pittsburgh, in the county of Allegheny and State of Pennsylvania, have invented a new and useful Improvement in Induction-Motor Windings, of which the following is a specification.

My invention relates to the windings of dynamo-electric machines and particularly to secondary windings for induction motors.

The object of my invention is to provide a secondary winding, of the squirrel cage type, that shall be particularly simple in construction and easy to wind and that shall comprise a plurality of short-circuited coils, together with means for holding the end portions of the coils in position under high-speed operating conditions.

According to my present invention, I provide a plurality of slotted strips of conducting material which are spread into short circuited coils of diamond shape and are wound in suitable slots in the core member of a dynamo-electric machine. After the coils are in position, the end-projecting portions are separated into groups, and end rings, having spaced holes through which the groups of the coil ends extend, are forced or shrunk upon the ends of the winding to hold the coils in position and to assist in producing the characteristics of a squirrel cage winding by interconnecting the coils at their ends.

Figure 1 of the accompanying drawings, is a plan view showing a portion of the core member of an induction motor secondary, wound in accordance with my invention. Fig. 2 is an end view of the motor secondary shown in Fig. 1 and Fig. 3 is a sectional elevation on the line III—III of Fig. 1.

Referring to the drawings, a substantially cylindrical laminated core member 1, having partially closed peripheral slots 2, is provided with a winding 3.

The winding 3 is composed of a plurality of single-turn short circuited coils 4 of diamond shape, the sides of which are respectively located in the bottom and in the top of a pair of non-adjacent core slots, and end-connecting rings 5. The rings 5 are of L-shape in cross section and are provided with flanges 6, having a plurality of spaced holes 7. After the coils are assembled in position, their ends are forced into groups which extend through the holes 7 in the rings.

The binding rings 5 may be of any suitable form and various modifications may be effected, within the spirit and scope of my invention.

I claim as my invention:

1. A winding for dynamo-electric machines comprising a plurality of diamond shaped coils having their end portions grouped, and end rings having spaced holes through which the coil end groups project.

2. A winding for dynamo-electric machines comprising a plurality of single-turn, short-circuited, diamond shaped coils, having their end portions grouped, and end rings having spaced holes through which the coil end groups project.

3. A winding for dynamo-electric machines comprising a plurality of single-turn, short circuited, diamond shaped coils, having their end portions grouped, and end rings which are of L-shape in transverse section and are provided with a plurality of spaced holes, through which the ends of the coils project.

In testimony whereof, I have hereunto subscribed my name this 23rd day of May, 1911.

CHARLES WILLIAM STARKER.

Witnesses:
R. P. SCHOYER,
B. B. HINES.